United States Patent
Moses et al.

(10) Patent No.: US 9,128,842 B2
(45) Date of Patent: Sep. 8, 2015

(54) APPARATUS AND METHOD FOR REDUCING THE FLUSHING TIME OF A CACHE

(71) Applicant: Intel Corporation, Santa Clara, CA (US)

(72) Inventors: Jaideep Moses, Portland, OR (US); Ravishankar Iyer, Portland, OR (US); Rameshkumar G. Illikkal, Portland, OR (US); Sadagopan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 13/631,625

(22) Filed: Sep. 28, 2012

(65) Prior Publication Data

US 2014/0095794 A1    Apr. 3, 2014

(51) Int. Cl.
*G06F 12/00* (2006.01)
*G06F 12/08* (2006.01)

(52) U.S. Cl.
CPC ..................... *G06F 12/08* (2013.01)

(58) Field of Classification Search
CPC ... G06F 12/08; G06F 1/3275; G06F 12/0822; G06F 12/0815
USPC .................................................. 711/135, 146
See application file for complete search history.

(56) References Cited

U.S. PATENT DOCUMENTS

| | | | |
|---|---|---|---|
| 6,347,379 B1 * | 2/2002 | Dai et al. ...................... | 713/320 |
| 7,934,054 B1 * | 4/2011 | Moll et al. .................... | 711/113 |
| 7,934,069 B2 | 4/2011 | Cochran et al. | |
| 8,180,968 B2 | 5/2012 | O'Krafka et al. | |
| 2004/0030835 A1 * | 2/2004 | van de Waerdt .............. | 711/128 |
| 2008/0244185 A1 * | 10/2008 | O'Krafka et al. ............. | 711/135 |
| 2008/0244192 A1 * | 10/2008 | Uchiyama ..................... | 711/144 |
| 2008/0270692 A1 * | 10/2008 | Cochran et al. ............... | 711/114 |
| 2008/0270703 A1 * | 10/2008 | Henrion et al. ............... | 711/128 |
| 2010/0235670 A1 * | 9/2010 | Keller et al. .................. | 713/324 |
| 2012/0005524 A1 * | 1/2012 | Rangarajan et al. ........... | 714/6.1 |
| 2012/0166731 A1 * | 6/2012 | Maciocco et al. ............. | 711/130 |

FOREIGN PATENT DOCUMENTS

WO  WO2014051803  *  4/2014  ............. G06F 9/06

OTHER PUBLICATIONS

PCT International Search Report for PCT Counterpart Application No. PCT/US2013/048362, 3 pgs., (Aug. 29, 2013).
PCT Written Opinion of the International Searching Authority for PCT Counterpart Application No. PCT/US2013/048362, 5 pgs., (Aug. 29, 2013).

* cited by examiner

*Primary Examiner* — Gurtej Bansal
(74) *Attorney, Agent, or Firm* — Nicholson De Vos; Webster & Elliott, LLP (57) ABSTRACT

A processor is described having cache circuitry and logic circuitry. The logic circuitry is to manage the entry and removal of cache lines from the cache circuitry. The logic circuitry includes storage circuitry and control circuitry. The storage circuitry is to store information identifying a set of cache lines within the cache that are in a modified state. The control circuitry is coupled to the storage circuitry to receive the information from the storage circuitry, responsive to a signal to flush the cache, and determine addresses of the cache therefrom so that the set of cache lines are read from the cache so as to avoid reading cache lines from the cache that are in an invalid or a clean state.

20 Claims, 6 Drawing Sheets

APPARATUS AND METHOD FOR REDUCING THE FLUSHING TIME OF A CACHE

FIELD OF INVENTION

The field of invention relates generally to a computing systems, and, more specifically, to an apparatus and method for reducing the flushing time of a cache.

BACKGROUND

Figure 1:
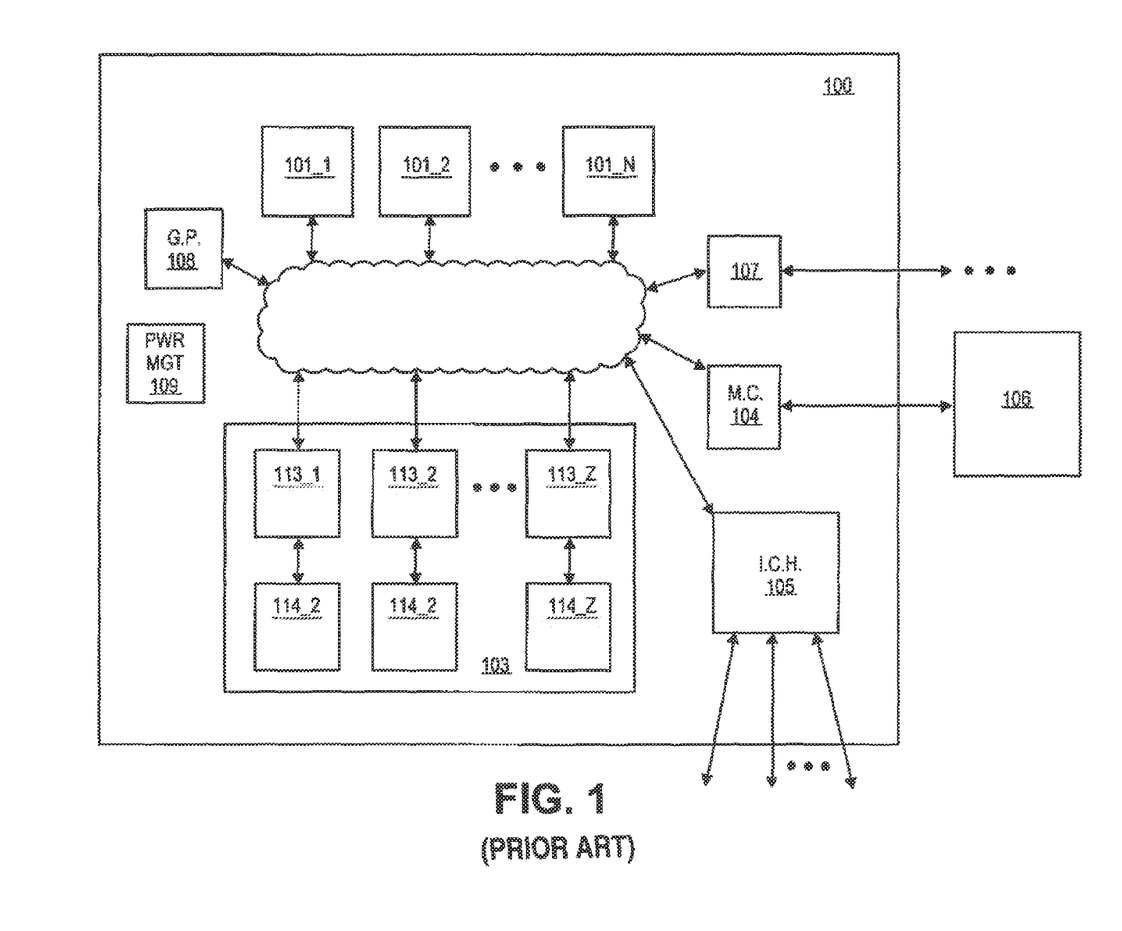
FIG. 1 (prior art) shows a traditional processor design.

FIG. 1 shows the architecture of an exemplary multi-core processor 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contain one or more instruction execution pipelines for executing program code instructions. The interconnect network 102 serves to interconnect each of the cores 101_1 to 101_N to each other as well as the other components 103, 104, 105. The last level caching system 103 serves as a last layer of cache in the processor before instructions and/or data are evicted to system memory 106.

The memory controller 104 reads/writes data and instructions from/to system memory 106. The I/O hub 105 manages communication between the processor and "I/O" devices (e.g., non volatile storage devices and/or network interfaces). Port 107 stems from the interconnection network 102 to link multiple processors so that systems having more than N cores can be realized. Graphics processor 108 performs graphics computations. Power management circuitry 109 manages the performance and power states of the processor as a whole ("package level") as well as aspects of the performance and power states of the individual units within the processor such as the individual cores. Other functional blocks of significance (e.g., phase locked loop (PLL) circuitry) are not depicted in FIG. 1 for convenience.

The last level caching system 103 includes multiple caching agents 113_1 through 113_Z. Each caching agent is responsible for managing its own respective "slice" of cache 114_1 through 114_Z. According to one implementation, each system memory address in the system uniquely maps to one of the cache slices 114_1-114_Z. According to this particular implementation, a memory access from any of the processing cores will be directed to only one of the cache agents 113_1-113_Z based on a hash of the memory address.

Each cache agent is not only responsible for delivering a cache line to the requesting core if there is a hit in its respective slice, but also, forward a request from a core to the memory controller 104 if there is a cache miss. Each cache agent is also responsible for implementing a cache coherence protocol (e.g., the MESI protocol or similar protocol) to ensure that the processing cores are not using stale data. Of course other processor and/or caching architectures than the particular core observed in FIG. 1 and discussed just above are possible.

As the power consumption of computing systems has become a matter of concern, most present day systems include sophisticated power management functions. A common framework is to define both "performance" states and "power" states. The entry and/or departure from any one of these states may be controlled, for example, by power management circuitry 109. A processor's performance is its ability to do work over a set time period. The higher a processor's performance the more work it can do over the set time period. A processor's performance can be adjusted during runtime by changing its internal clock speeds and voltage levels. As such, a processor's power consumption increases as its performance increases.

Thus, a processor's different performance states correspond to different clock settings and internal voltage settings so as to effect a different performance vs. power consumption tradeoff. According to the Advanced Configuration and Power Interface (ACPI) standard the different performance states are labeled with different "P numbers": P0, P1, P2 ... P_R, where, P0 represents the highest performance and power consumption state and PN represents the lowest level of power consumption that a processor is able to perform work at. The term "R" in "P_R" represents the fact that different processors may be configured to have different numbers of performance states.

In contrast to performance states, power states are largely directed to defining different "sleep modes" of a processor. According to the ACPI standard, the C0 state is the only power state at which the processor can do work. As such, for the processor to enter any of the performance states (P0 through P_R), the processor must be in the C0 power state. When no work is to be done and the processor is to be put to sleep, the processor can be put into any of a number of different power states C1, C2 ... C_S where each power state represents a different level of sleep and, correspondingly, a different amount of time needed to transition back to the operable C0 power state. Here, a different level of sleep means different power savings while the processor is sleeping.

A deeper level of sleep therefore corresponds to slower internal clock frequencies and/or lower internal supply voltages and/or more blocks of logic that receive a slower clock frequency and/or a lower supply voltage. Increasing C number corresponds to a deeper level of sleep. Therefore, for instance, a processor in the C2 power state might have lower internal supply voltages and more blocks of logic that are turned off than a processor in the C1 state. Because deeper power states corresponds to greater frequency and/or voltage swings and/or greater numbers of logic blocks that need to be turned on to return to the C0 state, deeper power states also take longer amounts of time to return to the C0 state.

A problem exists with respect to the size of the last level caching system 103 and sleep states when the last level cache is to be flushed. For example, certain "package level" power states may reduce the supply voltage to the last level caching system 103 requiring that its cached information be saved to external system memory 106 beforehand. As last level cache sizes are becoming quite large, too much time is being expended flushing the last level cache 103 of its data when entering a sleep state that requires the last level cache to be flushed.

Currently, respective state machines in the cache agents of processors designed by Intel Corporation of Santa Clara, Calif. use a WriteBackINValiDate (WBINVD) operation to effectively scroll through every location in every cache slice to flush the cache. When each cache line is read, a "dirty bit" that is kept within the cache line indicates whether the cache line has been modified or not. If it has been modified the cache line is saved externally from the cache (e.g., to system memory). The time spent accessing each location consumes too much time and is becoming a performance bottleneck for sleep state entry as cache sizes increase.

BRIEF DESCRIPTION OF THE DRAWINGS

The present invention is illustrated by way of example and not limitation in the figures of the accompanying drawings, in which like references indicate similar elements and in which:

FIG. 5b shows write and read processes to and from the memory devices of FIG. 5a;

FIG. 6 shows a memory device approach having a smaller footprint that the approach observed in FIG. 5a.

DETAILED DESCRIPTION

As is understood in the art, each cache line in a cache can be characterized as being clean, invalid or modified ("dirty"). If a cache line is clean, there is an identical copy of it in system memory. If a cache line is invalid it is not to be used (e.g., because a more up-to-date version of the cache line exists elsewhere in the system). If a cache line is modified it is understood to be the most up-to-date version of the cache line and has no duplicate in system memory. At any instant of time, the various cache lines of a last level cache are apt to include a mixture of clean, invalid and modified cache lines.

It is pertinent to recognize that, technically speaking, only the modified cache lines need actually be saved externally in order for the system to continue operation without error. That is, the clean cache lines need not be saved externally because a copy of each of them can be found in system memory, and, the invalid cache lines need not be externally saved because by definition they are not to be used. As such, in order for a computing system to flush its cache and continue operation without error, only the cache's modified cache lines need to be saved externally—e.g., to system memory—before the cache is powered down. Upon entry to a higher power state where the cache is powered up, the system need not even attempt to re-populate the cache as part of the entry to the higher power state and can simply operate out of system memory. The cache will begin to be populated with cache lines over the course of the ensuing runtime.

The prior art WBINVD process operates according to these principles. However, whether a cache line is modified or not (e.g., a dirty bit) is kept within the cache line itself. Therefore, each cache line needs to be read from the cache according to the prior art WBINVD process to understand whether it is modified. This "walkthrough" of each cache line consumes too much time as cache sizes are becoming very large.

Figure 2:
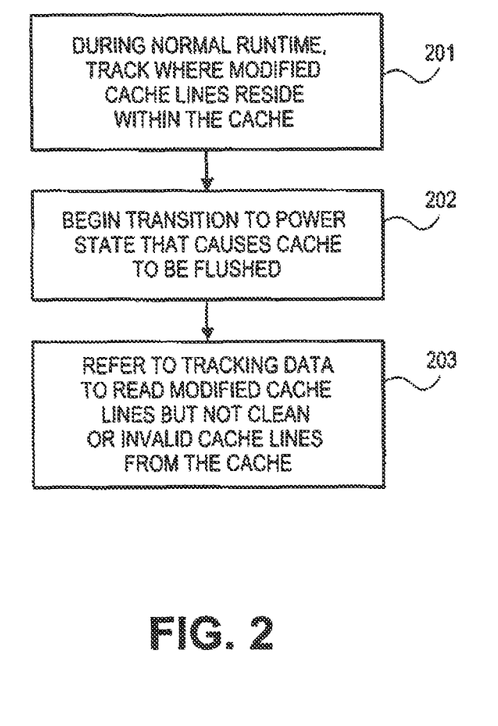
FIG. 2 shows a methodology for reducing the flushing time of a cache.

As such, FIG. 2 shows an improved process for managing entry to a power state that requires a cache flush. According to the process of FIG. 2, before entry into the power state is envisioned (e.g., during normal runtime when the cache is fully powered and operational), logic circuitry associated with the cache monitors the accesses made to the cache and tracks not only how many cache lines are modified, but also, where the modified cache lines exist in the cache 201.

Subsequently, a decision is made to enter a power state that requires the cache to be flushed (e.g., because it is being powered down) 202. In response to the decision that the power state is being entered, the logic circuitry refers to the tracked data and attempts to access the modified cache lines and save them externally to system memory. By so doing, the cache circuitry purposefully avoids reading clean or invalid data from the cache 203 only to discover that they are not modified. Said another way, by pinpointing the accesses to cache for only the modified cache lines, the walk through time of reading non modified cache lines is avoided which greatly speeds up the process by which dirty cache lines are identified. This "cuts down" the total number of accesses made to the cache during the walkthrough process as compared to the prior art approach.

Figure 3:
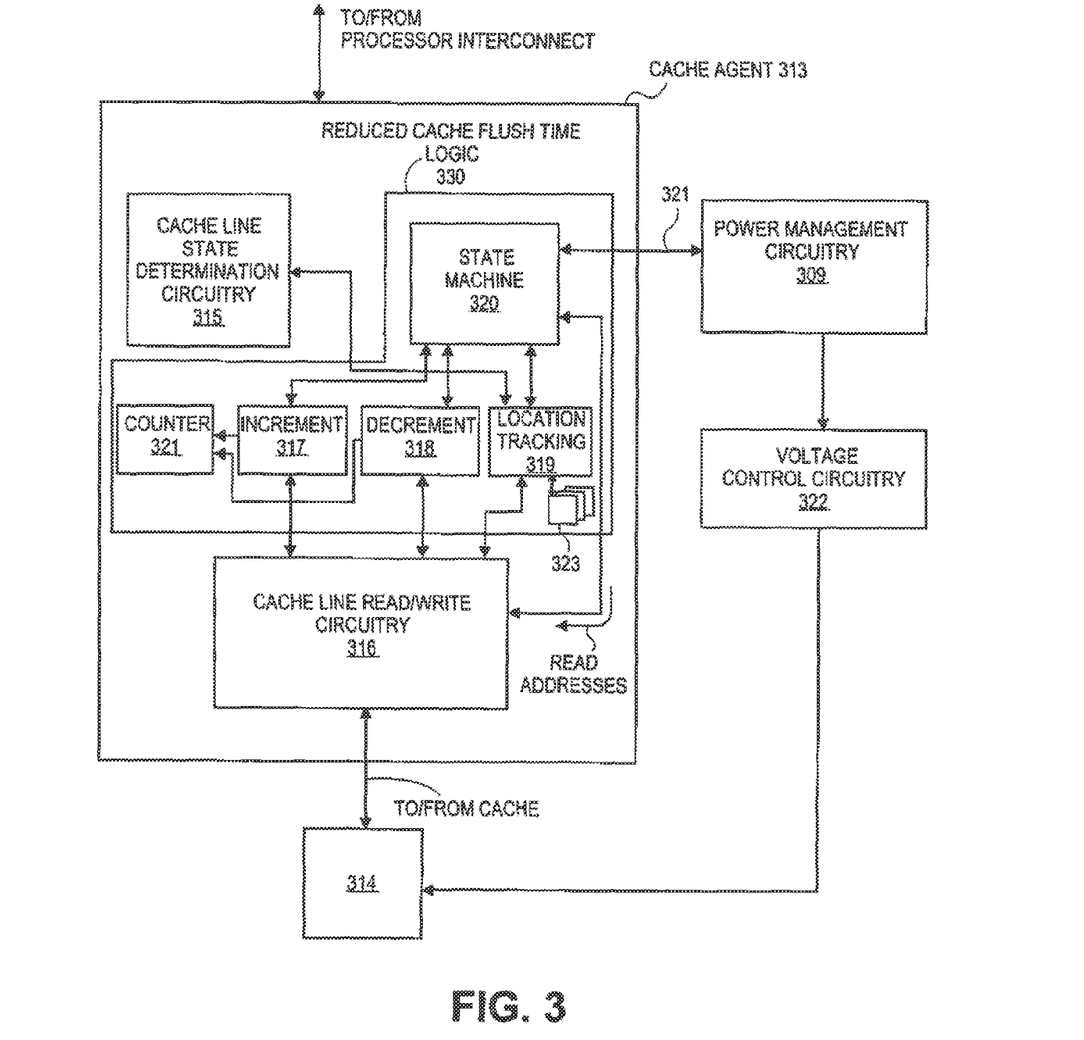
FIG. 3 shows a circuit design for reducing the flushing time of a cache.

FIG. 3 shows reduced cache flush time logic circuitry 330 designed to perform the methodology described above. The logic circuitry of FIG. 3 may be embedded in logic circuitry, such as cache agent logic circuitry 313, that includes logic circuitry that identifies cache line states and reads/writes from/to a cache or cache slice 315. According to the design of FIG. 3, the cache read/write logic 316 is enhanced with: 1) increment logic 317 that increments a counter 321 each time a cache line is written to so as to cause the cache line to transition to a modified state (e.g., from a clean state); 2) decrement logic 318 that decrements the counter 321 each time a modified cache line is evicted or declared invalid; and, 3) location tracking logic 319 that tracks where the cache lines within the cache 314 having a modified state reside within the cache. Here, cache 314 may be an entire cache or a segment of cache such as a cache slice. For simplicity the term cache will be used to refer to an entire cache or a segment of a cache.

In an embodiment, the increment logic 317 is further designed to ignore multiple writes to a same cache line. That is, once a cache line location is written to, the increment logic will not increment the counter if that same cache line is written to again. Here, two cache lines are deemed to be the "same" if they have the same system memory address. As such, multiple writes to the same cache line will not falsely increase the count of modified cache lines within the cache. In the situation where a modified cache line is evicted or declared invalid and then overwritten or otherwise replaced with a same or different cache line, the increment logic 317 will increment again because the counter will have been properly decremented with the eviction and/or invalidation.

In an embodiment, the location tracking logic 319 is coupled to one or more memories 323 or other type of storage circuitry that store information that identifies where the cache lines having a modified state reside within the cache. State machine logic circuitry 320 is also coupled to power management circuitry 309. Power management circuitry 309 recognizes a power state that requires the flushing of the cache and sends a signal along communication wiring 321 to state machine logic 320 indicating that the cache is to be flushed.

In response, in an embodiment, the state machine logic 320 refers to: 1) the counter 321 to understand how many modified cache lines exist within the cache 314; and, 2) location tracking circuitry 319 (which refers to storage circuitry 323) to understand where these cache lines are located within the cache 314. The state machine logic circuitry 320 proceeds to cause the modified cache lines to be read from the cache by presenting specific read addresses to read/write circuitry 316, where, the addresses correspond to cache lines in the modified state in the cache 314. (The term "tag" may also be used to refer to an address for a cache. For convenience the term "address" will be used). As such, largely if not entirely, only modified cache lines are read from the cache 314 and saved externally from it. By avoiding accesses to clean and invalid cache lines, the total time spent accessing the cache 314 during the flushing process should be noticeably reduced compared to prior art approaches that scanned the entire cache.

When the state machine 320 determines the flushing of the cache is complete it notifies the power management unit by way of communication wiring 321. In response the power management circuitry 309 sends a signal to voltage control circuitry 322 which, in turn, powers down the cache 314. Here, the unread clean and invalid cache lines are "lost" from the cache 314 as a consequence of the power down, but the system, as discussed above, does not need these cache lines to continue proper operation going forward. State machine 320 could alternatively be implemented with a controller, microcontroller or other type of circuit, all of which, including a state machine, may be referred to as a control circuit. More globally, any of the functions of the reduced flush time logic 330 could be implemented with executable code (e.g., by a micro-controller), dedicated logic circuitry or a mixture thereof.

As is understood in the art, different types of caches exist. On one end of the spectrum is a "direct mapped" cache in which any particular cache line in system memory can be stored in only one section of the cache. The section is specified by an index value. Said another way, each cache line in system memory can only have one associated index. The cache is divided up into different sections each having its own unique index value. Two different cache lines can map to different or same index values depending on the particular address of each and the (e.g., hashing) algorithm used to determine the index from the address.

On the other end of the spectrum is a fully associative cache. In the case of a fully associative cache, a cache line can be mapped to any cache location. In a sense, any cache line can map to any index value.

A set associative cache is a kind of hybrid between these two extremes. In the case of at least one type of set-associative cache, a cache line in system memory can map to a "set" but the set has more than one "way" where the cache line can be stored. Thus, for example, if each set in the cache has two ways, a cache line in system memory can map to two different locations (ways) within the set that the cache line maps to.

Figure 4:
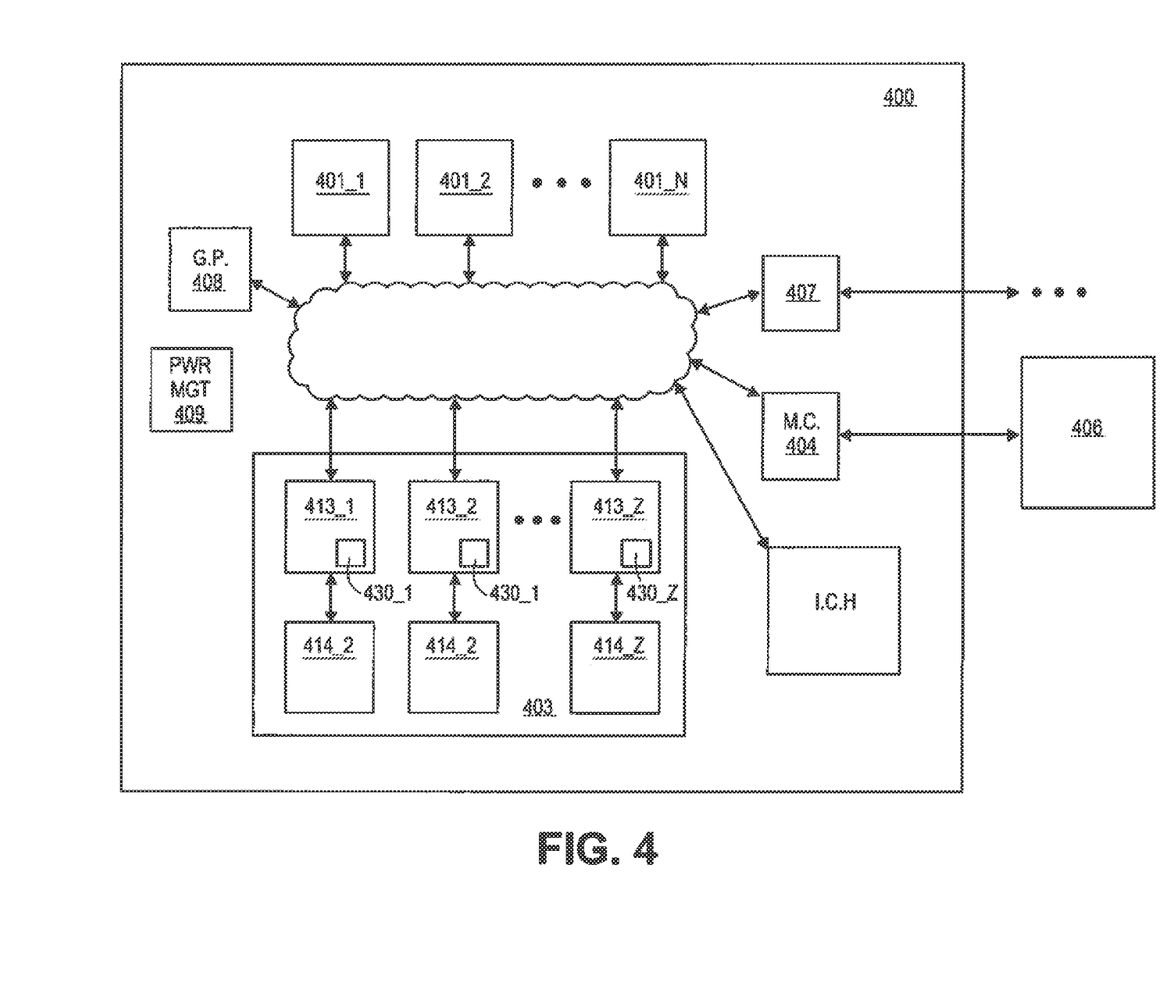
FIG. 4 shows a processor design that includes circuitry for reducing the flushing time of a cache.

FIG. 4 shows a more detailed implementation of a processor having a set-associative last level cache 403. The processor 400 of FIG. 4 includes the same elements as the processor 100 of FIG. 1, with the addition of reduced cache flush time logic 430_1 to 430_Z in each of the cache agents 413_1 to 413_Z. According to the embodiment of FIG. 4, each cache slice 414_1 to 414_Z is composed of Q "sets", each set having M "ways" of storage locations. According to one embodiment, each system memory address maps to a particular set within a particular cache slice unit. Each cache line within system memory can be stored in any of the ways of the particular set that it maps to.

Consistent with the discussion of FIGS. 2 and 3 above, the cache flush time reduction circuitry 430_1 to 430_Z of each of the cache agents 413_1 to 413_Z track which ones of their stored cache lines is in the modified state, and, upon receiving a cache flush command from the power management unit 409, reads the modified cache lines but refrains from reading invalid or clean cache lines from its cache slice prior to power down of the cache slice. The "saved" modified cache lines are written elsewhere, such as within a system memory 406 that is external to the processor 400. The cache flush time reduction circuitry 430_1 to 430_Z of each cache agent includes storage circuitry to track where the modified cache lines within its respective cache slice reside. In an embodiment, each of the storage circuits record where each of its respective cache slice's modified cache lines are stored in terms of a specific set and specific way.

Figure 5A:
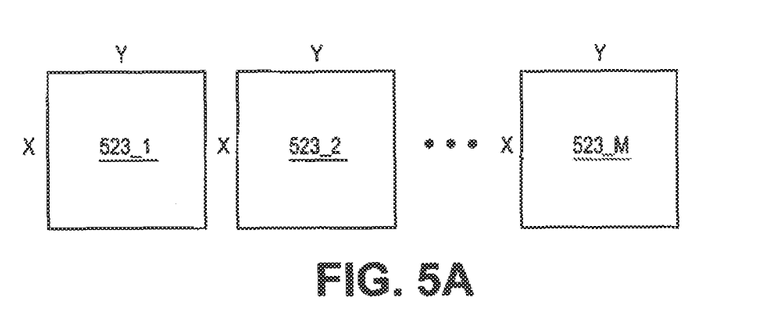
FIG. 5a shows an architecture for memory devices used to keep track of which cache lines in a cache are in a modified state.

FIG. 5a shows storage circuit 523_1 to 523_M structured as M different storage matrices where M is the number of ways associated with each set in a caching system. Storage circuits 523_1 to 523_M may be viewed as an embodiment of storage circuit(s) 323 of FIG. 3. The size of the matrices are defined by X rows and Y columns where X×Y=Q=the number of sets within the cache slice. Each storage location in the matrix need only store one bit to indicate whether the cache line corresponding to the location is in a modified state. Other bits could be kept at each location to store, for instance, additional information for each cache line in the cache slice.

Here, particularly with a large cache, the number of sets stored by a cache slice is apt to be much larger than the number of ways established for each set. For example, a possible implementation for a cache slice would include storage resources for 8,192 sets each having 16 associated ways. As such, the storage circuitry 523_1 to 523_M maintained by the cache agent for the cache slice would include M=16 matrices each having storage capacity for 8,192 different locations. In a further embodiment, the 8,192 storage locations of each matrix are identifiable through one of 128 rows and one of 64 columns (i.e., X=128; Y=64; X×Y=128×64=8192=Q=number of sets kept by the cache slice). Note that, in the case of 64 byte cache line sizes, this architecture corresponds to a cache slice size of 8192×16×64=8,388,608 megabytes (MB) which is large compared to traditional designs.

It should be apparent that stepping through such a large number of locations to individually determine the modified state of each cache line would consume a noticeable amount of time and dampen system performance owing to the time wasted waiting for the cache to be flushed. The prior art WBINVD approach effectively steps through each cache line location to flush the cache.

As such, in order to reduce "walkthrough" scanning times, the storage circuits 523_1 to 523_M are architected such that one dimension (e.g., the 128 rows along the X dimension) corresponds to addresses of different memory words of a particular storage circuit 523, and, the other dimension of the matrix (e.g., the 64 columns along the Y dimension) corresponds to different bit positions in a memory word of the particular storage circuit 523. In this case, each storage circuit matrix 523_1 to 523_M could be realized with a 1024 KB memory having 128 separately addressable 64 bit words. Each time a word from the memory is read, the modified state of 64 different cache lines is provided. This has the effect of reducing the scan time by a factor of 64 as compared to a process that must read each cache line individually. Of course, some additional time will be spent actually fetching the modified cache lines from the cache slice once their location is known. However, the reading of the storage circuits 523_1 through 523_M could be performed, at least partially, in parallel with the fetching of modified cache lines from the cache slice.

Figure 5B:
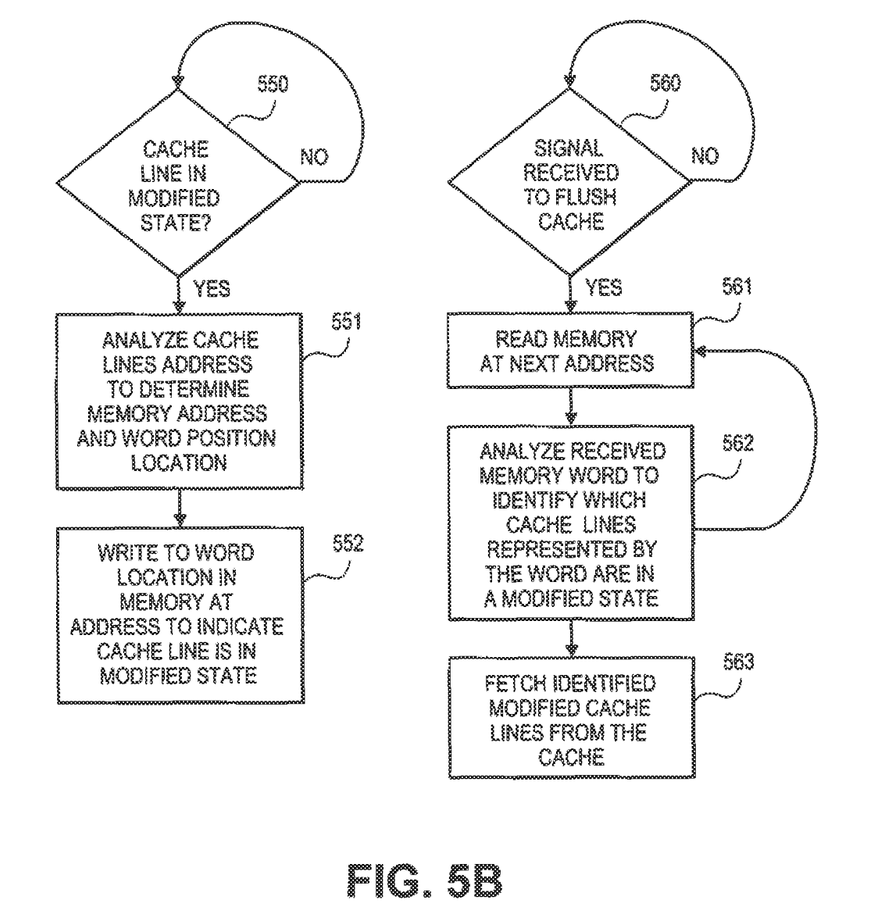

FIG. 5b shows a more detailed embodiment of how the modified tracking logic circuitry 319 of FIG. 3 may operate with the storage circuitry 523_1-523_M of FIG. 5. FIG. 5b shows both a write process and a read process. According to the write process, a determination is made 550 that a cache line is changing state to a modified state (e.g., from a clean state) or is otherwise recognized as being within a modified state. The detection may be made, for instance, in response to a determination that a clean cache line is being overwritten in the cache with new data. In the embodiment of FIG. 3, the determination may be made by circuitry 315 and forwarded to tracking circuitry 319. In response to the determination that a cache line is in a modified state, the cache line's address is analyzed 551 to determine an address and word location (e.g., bit position) of a memory word in a memory. The address and bit position correspond to the cache line's location in the cache. A write operation is then performed 552 into the memory with the address to set a bit in the bit position of the memory word to indicate that the cache line is in a modified state. Concurrently, the cache line itself may be stored in the cache.

Subsequently another similar process could be used to clear the same bit in response to a later detection that the same cache line was later invalidated.

According to the read process of FIG. 5b, a signal is received (e.g., from a state machine and/or power control unit) to flush a cache 560. In response, the memory is read at a first address 561. The memory word that is returned is analyzed 562 to determine which of the multiple different cache lines in the cache represented by the word are presently in a modified state. The cache lines that are determined to be in a modified state are then reported to the state machine 320 which fetches them from the cache. The next address in the memory is determined and the corresponding word analyzed to repeat the process. Eventually the memory is fully read and the appropriate cache lines are read from the cache. If a cache agent has multiple instances of the memory (e.g., one memory for each of M ways in the cache agent's cache slice as observed in FIG. 5a), the methodologies of FIG. 5b can be performed for each memory associated with the cache agent. At least write processes to different memories can be performed in parallel and read memories from different memories can be performed in parallel.

Those of ordinary skill will appreciate that other architectures are possible. For example, in a more centralized approach, a single memory could be instantiated at a single cache agent rather than multiple memories. In an even further centralized approach, a single memory could be used for an entire cache rather than just a cache slice. Also, the memories themselves may be architected in various ways. For instance, word lengths may be greater or less than 64 bits. Registers may be used as storage cells. For purposes of this application the term "memory" may be used to refer to a random access memory or a plurality of registers.

The exemplary embodiment discussed above with respect to FIGS. 5a and 5b could also be provided with an additional potential speed up by storing additional words to each of the storage circuits 523_1 to 523_M that indicate which of the memory words in the memory do not have any indication of a modified cache line. For example, recall that the exemplary memory matrices included 128 separately addressable words of 64 bits each. Each word represents 64 different cache lines in the cache slice. If the size of each memory circuit was expanded to include 130 separately addressable words rather than 128 separately addressable words, the two extra words could be used to indicate which of the 128 words do not contain any indication of a modified cache line.

For example, the 64 bits of the first extra word could be used to indicate which of separately addressable words 1 through 64 do not contain any indication of a modified cache line, and, the 64 bits of the second extra word could be used to indicate which of separately addressable words 65 through 128 do not contain any indication of a modified cache line. Upon an indication of a need to flush the cache slice, the state machine first reads the two extra words to understand which, if any, of separately addressable words 1 through 128 do not contain any indication of a modified cache line. In response to digesting this information, the state machine then proceeds, in scanning separately addressable words 1 through 128, to skip over any of those words that do not contain any indication of a cache line that is in a modified state. If more than two words are skipped over, a speed up is realized (owing to the read of the extra two words).

Here, the read process of FIG. 5b would have additional procedures to write to the appropriate extra word when a word in the memory is written to so as to indicate a cache line is in a modified state. Likewise, the write process of FIG. 5b would have additional procedures to initially read the extra words to understand which if any of the normally scanned words could be eliminated. The number of extra words could of course vary from embodiment to embodiment. In an embodiment, the processor is designed to enable the use of the extra words at the option of the user. For example, software may write to model specific register space (MSR) to indicate whether the extra words and associated extra processes are to be enabled. The setting may be influenced by the type of application software program being run and its associated data (e.g., the extra words are enabled if the data is expected to have large portions of cached cache lines that are not in a modified state).

Note that the approaches discussed above for FIGS. 5a and 5b do not require the counter 321 of FIG. 3b to actually be utilized. That is, the state machine 320 can determine the number of cache lines that are in a modified state from the memory circuit(s) 323/523. In an embodiment the counter 321 is nevertheless utilized as a check against the information stored in the memory circuit(s) 323/523. If a discrepancy arises between the counter value 321 and what is gleaned from the memory circuit(s) 323/523, the state machine may raise an interrupt or other type of flag to signify some kind error.

Figure 6:
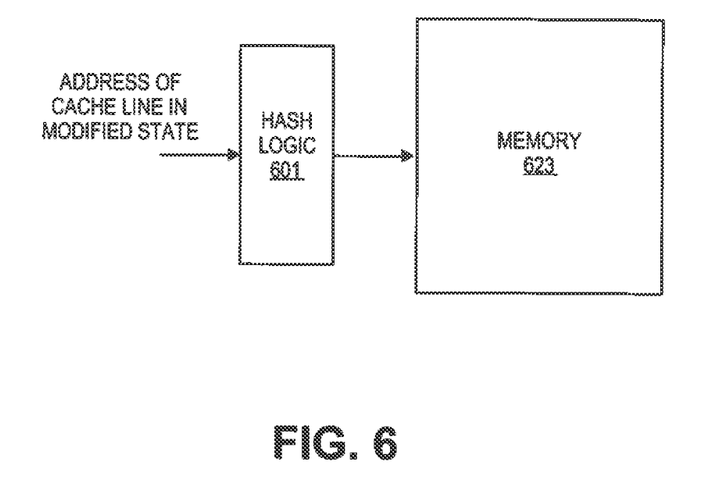

FIG. 6 shows another alternative approach that attempts to reduce the size of the footprint of memory circuit(s) 323. That is, the approach of FIG. 6 is designed to reduce the size of the memory 623 used to keep track of which cache lines are in a modified state. Here, some accuracy is sacrificed compared to the approach described just above in that there is only one bit reserved to represent the modified/not modified status of multiple cache lines in the cache. Hash logic 601 implements a hashing algorithm to map different addresses of different cache lines that are in a modified state to a single bit within memory 623. Here, if any cache lines in a group that map to a same bit position in the memory 623 change state to a modified state or are otherwise recognized as being in the modified state, the bit representing the group is set in memory 623 to indicate a modified state. This means that upon a cache flush operation, all cache lines in the group will be read from the cache before power down of the cache even though some of them may not be in a modified state.

As any of the logic processes taught by the discussion above may be performed with a controller, micro-controller or similar component, such processes may be program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor comprising:
a cache; and
logic circuitry to manage entry and removal of cache lines from said cache, said logic circuitry comprising:
   storage circuitry to store information identifying a set of cache lines within said cache that are in a modified state; and
   control circuitry coupled to said storage circuitry to receive said information from said storage circuitry and determine addresses of said set of cache lines therefrom in response to a signal to flush said cache to avoid reading cache lines during the flush from said cache that are in an invalid or a clean state;
   increment logic to increment a counter for each of a plurality of cache line transitions to the modified state; and
   decrement logic to decrement the counter each time a modified cache line is at least one of evicted and declared invalid until the cache is flushed.

2. The processor of claim 1 further comprising power management circuitry coupled to said logic circuitry, said power management circuitry to provide said signal to flush.

3. The processor of claim 1 further comprising voltage control circuitry to cause a voltage applied to said cache to be lowered after said set of cache lines have been read from said cache.

4. The processor of claim 1, further comprising power management circuitry to reduce a supply voltage to said cache after the cache is flushed.

5. The processor of claim 1, wherein the increment logic is not to increment the counter if a previously counted cache line is again modified.

6. The processor of claim 1 wherein said logic circuitry is part of a cache agent and said cache is a cache slice.

7. The processor of claim 1 wherein said storage circuitry is a memory to store words having locations corresponding to specific locations within said cache.

8. The processor of claim 7 wherein said specific locations within said cache correspond to a specific set and way of said cache.

9. A method comprising:
in response to a determination that a cache line of a cache is in a modified state, writing information to a memory that indicates said cache line is in the modified state;
determining an address of said cache line from said information in said memory in response to a signal to flush said cache to avoid reading cache lines during the flush from said cache that are in an invalid or a clean state;
incrementing a counter for each of a plurality of cache line transitions to the modified state; and
decrementing the counter each time a modified cache line is at least one of evicted and declared invalid until the cache is flushed.

10. The method of claim 9 further comprising power management circuitry generating said signal.

11. The method of claim 9, further comprising reducing a supply voltage to said cache after the cache is flushed.

12. The method of claim 9, wherein the counter is not incremented if a previously counted cache line is again modified.

13. The method of claim 9 wherein said information is stored in a location of said memory that corresponds to a set and way of a cache slice where said cache line is stored.

14. The method of claim 13 further comprising determining the address of said cache line in said cache from said set and way information, and applying that address to said cache to read said cache line.

15. The method of claim 14 further comprising saving said cache line to second storage circuitry after reading said cache line from said cache.

16. A processor comprising:
a cache agent coupled to a cache slice, said cache agent comprising:
   cache line state determination circuitry;
   cache line state tracking circuitry coupled to said cache line state determination circuitry;
   storage circuitry coupled to said cache line state tracking circuitry, said cache line state tracking circuitry to write information into said storage circuitry that identifies which of said cache slice's cache lines are in a modified state, said cache line state determination circuitry to inform said cache line state tracking circuitry which of said cache slice's cache lines are in the modified state; and
   power management circuitry coupled to said cache agent, said power management circuitry to provide a signal to flush to said cache agent to cause said cache agent to refer to information within said storage circuitry in order to read modified cache lines from said cache slice and avoid reading clean or invalid cache lines from said cache slice during the flush; and
   increment logic to increment a counter for each of a plurality of cache line transitions to the modified state; and
   decrement logic to decrement the counter each time a modified cache line is at least one of evicted and declared invalid until the cache is flushed.

17. The processor of claim 16 further comprising voltage control circuitry to cause a voltage applied to said cache slice to be lowered after said cache slice's modified cache lines have been read from said cache.

18. The processor of claim 16 wherein said storage circuitry is a memory whose memory words have different locations each correlated to a different set and way combination within said cache slice.

19. The processor of claim 16, further comprising power management circuitry to reduce a supply voltage to said cache after the cache is flushed.

20. The processor of claim 16, wherein the increment logic is not to increment the counter if a previously counted cache line is again modified.

* * * * *